(No Model.)

J. B. BRACKETT.
STOPPER FOR JUGS.

No. 315,114. Patented Apr. 7, 1885.

Witnesses
S. N. Piper
Ernest B. Pratt

Inventor
Jefferson B. Brackett.
by R. H. Eddy atty.

UNITED STATES PATENT OFFICE.

JEFFERSON BRAY BRACKETT, OF LEEDS JUNCTION, MAINE.

STOPPER FOR JUGS.

SPECIFICATION forming part of Letters Patent No. 315,114, dated April 7, 1885.

Application filed February 24, 1885. (No model.)

*To all whom it may concern:*

Be it known that I, JEFFERSON BRAY BRACKETT, of Leeds Junction, in the county of Androscoggin, of the State of Maine, have invented a new and useful Improvement in Stoppers for Jugs or Various other Kinds of Vessels for Holding Liquids; and I do hereby declare the same to be described in the following specification and represented in the accompanying drawings, of which—

Figures 1, 2, 3, and 4 are transverse sections of stoppers provided with my invention, the nature of which is defined in the claim hereinafter presented.

Figure 1:
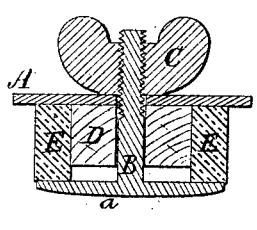
Figure 2:
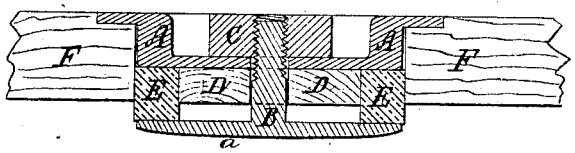
Figure 4:
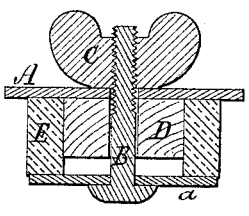
Figure 3:
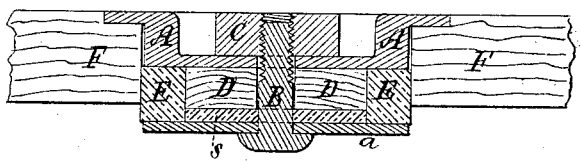

In Figs. 1 and 2 the screw B of the stopper is shown as having its shank united to and projecting from the plate $a$; whereas in Figs. 3 and 4 the screw is exhibited as separate from and having its shank extending through the plate $a$, the screw-head bearing against the said plate.

The stopper on which my invention is based consists, usually, of a cylindrical block of rubber, two disks having the said rubber block between them, and the outer disk larger in diameter than the inner one, a screw having its shank going through the two disks, or the rubber and the outer one, and a nut to screw upon the screw and against the larger disk.

In carrying out my invention I do not use between the two plates a cylindrical block of india-rubber or a conic frustum thereof, but in place of such I use a disk or circular block of wood or metal or other sufficiently inelastic material, and a ring of rubber or other proper elastic or yielding substance, rubber vulcanized being preferable, the said rubber ring being deeper than and encompassing the inelastic disk, centrally through which the shank of the screw passes. With the wooden or inelastic disk or circular block within the elastic or rubber annulus I save the necessity of having between the two plates a disk or cylindrical block of rubber of a depth corresponding to that of the elastic ring, and in consequence can construct the stopper very much cheaper, and render it better in some respects.

In the drawings, A is a circular metallic plate or bearing, which, when the stopper is in use, is to cover the mouth of the bottle, or when made as shown in Figs. 2 and 3 is chambered to receive the nut C, in which case the part A is designed not only to cover, but to be inserted in, a bung-hole in the head or stave F of a barrel.

When the plate $a$ is joined to the shank of the screw B, as shown in Figs. 1 and 2, there is no danger of leakage through the plate, as there is when the screw-shank is separate from and going through the plate. On the shank of the screw B there is placed concentrically a disk, D, of wood or other inelastic proper material, and such disk is circumscribed by a ring, E, of india-rubber or some other suitable water-proof and yielding material, such ring E having a depth greater than that of the disk B.

In Fig. 3 the ring E is shown as not only extending around the periphery of the disk D, but as having an extension or disk, S, going between the said disk D and the plate $a$, and around and against the shank of the screw B, the said extension being to make a tight joint around the shank of the screw to prevent leakage through the passage of the said shank.

On screwing the nut C down upon the screw B the plate $a$ will be drawn upward relatively to the disk or bearing A, and in so doing will contract the ring E vertically and expand it radially, so as to cause it to closely fit the mouth of a bottle or a bung-hole in, which such stopper may be.

The inelastic disk D serves also as an abutment or support for the elastic ring to rest against while being expanded radially of it.

I claim—

The combination of the auxiliary or inelastic disk D and the elastic ring E, encompassing it and of greater depth relatively to it, with the plates A and $a$, having the ring and disk between them, and with the screw B and its nut C, the shank of the screw going through the plate A and the disk D, and all being to operate substantially as set forth.

JEFFERSON BRAY BRACKETT.

Witnesses:
   A. K. P. KNOWLTON,
   A. L. TALBOT.